(12) United States Patent
Miyatani

(10) Patent No.: US 12,489,992 B2
(45) Date of Patent: Dec. 2, 2025

(54) INFORMATION PROCESSING APPARATUS, INFORMATION PROCESSING METHOD, AND PROGRAM

(71) Applicant: Sony Semiconductor Solutions Corporation, Kanagawa (JP)

(72) Inventor: Yoshitaka Miyatani, Tokyo (JP)

(73) Assignee: Sony Semiconductor Solutions Corporation

( * ) Notice: Subject to any disclaimer, the term of this patent is extended or adjusted under 35 U.S.C. 154(b) by 35 days.

(21) Appl. No.: 18/263,657

(22) PCT Filed: Jan. 14, 2022

(86) PCT No.: PCT/JP2022/001100
§ 371 (c)(1),
(2) Date: Jul. 31, 2023

(87) PCT Pub. No.: WO2022/190622
PCT Pub. Date: Sep. 15, 2022

(65) Prior Publication Data
US 2024/0073552 A1    Feb. 29, 2024

(30) Foreign Application Priority Data
Mar. 8, 2021    (JP) ................... 2021-036012

(51) Int. Cl.
*H04N 25/47* (2023.01)
*G01H 9/00* (2006.01)
(Continued)

(52) U.S. Cl.
CPC ............ *H04N 25/47* (2023.01); *G01H 9/00* (2013.01); *H04N 23/633* (2023.01); *H04N 25/40* (2023.01)

(58) Field of Classification Search
None
See application file for complete search history.

(56) References Cited

U.S. PATENT DOCUMENTS

2018/0262705 A1*  9/2018  Park .................. H04N 25/79
2020/0201159 A1*  6/2020  Iwasaki ............. G03B 21/606
(Continued)

FOREIGN PATENT DOCUMENTS

JP    2020186957 A    11/2020
WO   WO-2016103271 A2 *  6/2016  ............ B60N 2/002
(Continued)

OTHER PUBLICATIONS

International Search Report (PCT/ISA/210), International Application No. PCT/JP2022/001100, dated Mar. 8, 2022.
(Continued)

*Primary Examiner* — Gelek W Topgyal
(74) *Attorney, Agent, or Firm* — Michael Best & Friedrich LLP

(57) ABSTRACT

The present disclosure relates to an information processing apparatus, an information processing method, and a program enabling to achieve more suitable vibration monitoring.

A vibration detection unit generates vibration information representing a vibration state of a subject, on the basis of event data that is output from an EVS and includes a pixel position, a time, and a polarity at which an event that is a luminance change for each pixel has occurred. The technology according to the present disclosure can be applied to, for example, a vibration monitoring system.

14 Claims, 17 Drawing Sheets

(51) Int. Cl.
*H04N 23/63* (2023.01)
*H04N 25/40* (2023.01)

(56) References Cited

U.S. PATENT DOCUMENTS

2022/0060230 A1* 2/2022 Na .................... G06F 21/32
2022/0205835 A1* 6/2022 Burns ................. G01H 9/002

FOREIGN PATENT DOCUMENTS

| WO | WO-2019064968 A1 * | 4/2019 | ............ G02B 13/24 |
| WO | 2020120782 A1 | 6/2020 | |
| WO | 2020157157 A1 | 8/2020 | |
| WO | WO-2020216953 A1 * | 10/2020 | ............... G01D 5/26 |

OTHER PUBLICATIONS

Dorn, Charles et al., Efficient Full-Field Vibration Measurements and Operational Modal Analysis Using Neuromorphic Event-Based Imaging, Journal of Engineering Mechanics, Jul. 2018, vol. 144, Issue 7, 04018054, https://doi.org/10.1061/.
Everding Lukas et al: "Low-Latency Line Tracking Using EventBased Dynamic Vision Sensors", Frontiers in Neurorobotics,vol. 12, Feb. 19, 2018 (Feb. 19, 2018), p. 13, XP055946872.

* cited by examiner

INFORMATION PROCESSING APPARATUS, INFORMATION PROCESSING METHOD, AND PROGRAM

TECHNICAL FIELD

The present disclosure relates to an information processing apparatus, an information processing method, and a program, and particularly relates to an information processing apparatus, an information processing method, and a program enabling to achieve more suitable vibration monitoring.

BACKGROUND ART

Conventionally, there is a vibration analysis method for grasping a vibration state of a subject as a monitoring target, by analyzing multiple images captured in time series.

For example, Patent Document 1 discloses a vibration analysis system that calculates a phase difference representing a vibration state of an inspection target on the basis of time-series images.

CITATION LIST

Patent Document

Patent Document 1: Japanese Patent Application Laid-Open No. 2020-186957

SUMMARY OF THE INVENTION

Problems to be Solved by the Invention

In general, in a case of measuring vibration, it is necessary to perform sampling at a sampling frequency that is twice or more a frequency of the vibration to be measured.

However, there has been a possibility that, in time-series images output at regular intervals according to a frame rate, sampling cannot be performed at a sufficient sampling frequency depending on the frame rate, and vibration of a high frequency cannot be accurately monitored.

The present disclosure has been made in view of such a situation, and an object is to achieve more suitable vibration monitoring.

Solutions to Problems

An information processing apparatus according to the present disclosure is an information processing apparatus including a vibration detection unit configured to generate vibration information indicating a vibration state of a subject, on the basis of event data output from an event-based vision sensor (EVS), the event data including a pixel position, a time, and a polarity at which an event that is a luminance change for each pixel has occurred.

An information processing method of the present disclosure is an information processing method including, by an information processing apparatus, generating vibration information representing a vibration state of a subject, on the basis of event data output from an event-based vision sensor (EVS), the event data including a pixel position, a time, and a polarity at which an event that is a luminance change for each pixel has occurred.

A program of the present disclosure is a program for causing the computer to execute processing including: generating vibration information representing a vibration state of a subject, on the basis of event data output from an event-based vision sensor (EVS), the event data including a pixel position, a time, and a polarity at which an event that is a luminance change for each pixel has occurred.

In the present disclosure, vibration information indicating a vibration state of a subject is generated, on the basis of event data that is output from an event-based vision sensor (EVS) and includes a pixel position, a time, and a polarity at which an event that is a luminance change for each pixel has occurred.

MODE FOR CARRYING OUT THE INVENTION

Figure 1:
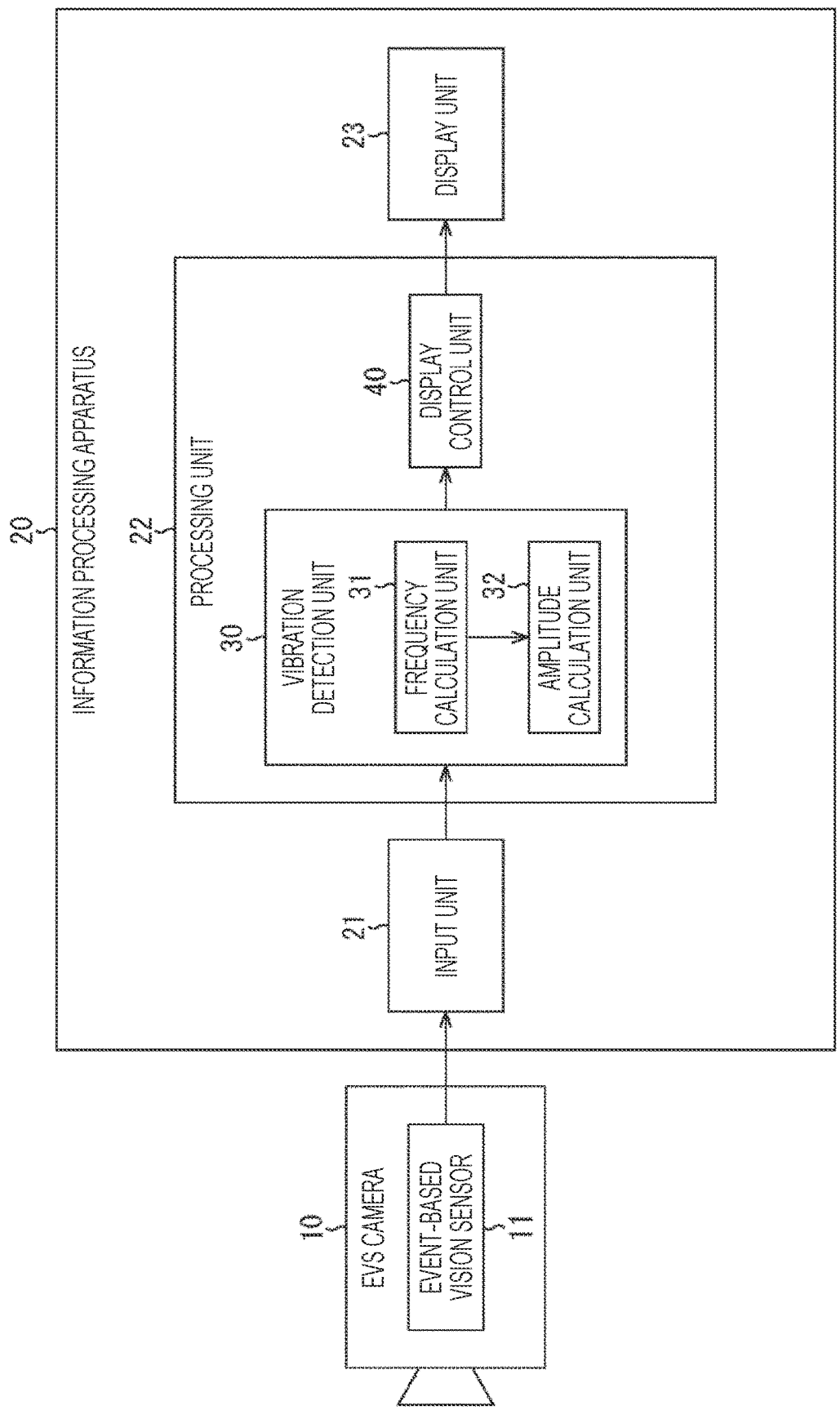
FIG. 1 is a diagram illustrating a configuration example of a vibration monitoring system according to an embodiment of the present disclosure.

Hereinafter, an embodiment for implementing the present disclosure (hereinafter, referred to as an embodiment) will be described. Note that the description will be given in the following order.

1. Problems of prior art
2. Configuration example of vibration monitoring system
3. Flow of vibration detection processing
4. Displaying of frequency image
5. Problem and countermeasure in amplitude calculation
6. Frequency calculation by restoring luminance change
7. Frequency separation in case where EVS camera is vibrating 8. Configuration example of EVS camera
9. Application example of technology according to present disclosure
10. Configuration example of computer <1. Problems of Prior Art>

Various vibration sensors used for measuring vibration are known.

Usually, the vibration sensor measures displacement of one point on an object surface as a measurement target. Therefore, in order to grasp a vibration state of the entire object, a plurality of vibration sensors is required, and a measurement time becomes longer accordingly.

Furthermore, a contact-type vibration sensor that measures vibration by coming into contact with an object may be broken or damaged by the vibration of the object. A non-contact type vibration sensor using reflection of laser light or the like requires a light source, which increases cost.

As a method for grasping a vibration state of the entire object in a non-contact manner, there is a vibration analysis method for grasping a vibration state of a subject as a monitoring target by analyzing multiple images (time-series images) captured in time series.

In general, in a case of measuring vibration, it is necessary to perform sampling at a sampling frequency that is twice or more a frequency of the vibration to be measured.

However, there has been a possibility that, in time-series images output at regular intervals according to a frame rate, sampling cannot be performed at a sufficient sampling frequency depending on the frame rate, and vibration of a high frequency cannot be accurately monitored.

In relation to such an image sensor that outputs an image in a frame-based manner, in recent years, an event-based vision sensor (hereinafter, referred to as an EVS) that asynchronously outputs pixel data in an event-based manner is known.

Since the EVS asynchronously detects a luminance change in each pixel as an event and outputs only data of the pixel in which the event is detected, it is possible to output data with high efficiency, high speed, and low delay. The EVS has features such as higher time resolution and lower power consumption as compared with a conventional image sensor.

Therefore, in the technology according to the present disclosure, more suitable vibration monitoring is achieved by vibration detection based on data from the EVS.

<2. Configuration Example of Vibration Monitoring System>

FIG. 1 is a diagram illustrating a configuration example of a vibration monitoring system which is one of embodiments of the present disclosure.

The vibration monitoring system in FIG. 1 includes an EVS camera 10 and an information processing apparatus 20.

The EVS camera 10 includes an event-based vision sensor (EVS) 11, and outputs event data to the information processing apparatus 20 by capturing an image of a subject as a monitoring target for vibration.

The EVS 11 includes multiple pixels arranged in a matrix, for example. The EVS 11 detects a luminance change in a pixel as an event, and asynchronously outputs event data for each pixel in which an event has occurred. Note that the event data for each pixel is not necessarily output asynchronously.

The event data includes information about a pixel position (coordinates) (x, y), a time t, and a polarity p of the pixel in which the event has occurred. The polarity p is binary information indicating an increase or a decrease in luminance value in each pixel compared to that before the occurrence of the event. The event data is data to be output when the luminance value changes by a predetermined threshold value or more, and is not output when the luminance value does not change by the threshold value or more. Therefore, the data is extremely sparse as compared with image data output by the frame-based method.

The information processing apparatus 20 is configured as a computer such as a personal computer (PC), for example. The information processing apparatus 20 includes an input unit 21, a processing unit 22, and a display unit 23.

The input unit 21 includes a connection interface that connects between the EVS camera 10 and the information processing apparatus 20. The input unit 21 inputs event data for each pixel output from the EVS 11, to the processing unit 22.

The processing unit 22 includes a processor such as a central processing unit (CPU). The processing unit 22 executes predetermined processing on the basis of event data from the input unit 21, and supplies a processing result thereof to the display unit 23.

The display unit 23 includes a liquid crystal display, an organic electro-luminescence (EL) display, or the like. The display unit 23 displays information according to the processing result from the processing unit 22. The display unit 23 may be provided outside the information processing apparatus 20.

The processing unit 22 implements a vibration detection unit 30 and a display control unit 40 by executing a predetermined program.

The vibration detection unit 30 generates vibration information indicating a vibration state of a subject as a monitoring target for vibration on the basis of event data for each pixel output from the EVS 11, and supplies the vibration information to the display control unit 40. The vibration information includes a frequency and an amplitude of vibration of the subject.

The vibration detection unit 30 includes a frequency calculation unit 31 and an amplitude calculation unit 32.

The frequency calculation unit 31 calculates a frequency of vibration of the subject as the vibration information described above, on the basis of the event data from the EVS 11. Specifically, the frequency calculation unit 31 generates frequency two-dimensional data having frequency information indicating a frequency for each pixel position of the pixels of the EVS 11, on the basis of event data output during a predetermined period.

That is, the frequency two-dimensional data is two-dimensional array data having a frequency of vibration of the subject as a pixel value only at a pixel position corresponding to the vibrating subject, in an image-capturing range of the EVS camera 10. In the event data from the EVS 11, a luminance change in an edge (contour) portion of the vibrating subject becomes large. Therefore, in the frequency two-dimensional data, frequency information is held at a pixel position corresponding to the edge portion of the vibrating subject.

The amplitude calculation unit 32 calculates an amplitude of vibration of the subject as the vibration information described above, on the basis of the frequency two-dimensional data generated by the frequency calculation unit 31. Specifically, the amplitude calculation unit 32 calculates an amplitude of vibration of the subject by setting, as one subject, a pixel region having the same frequency information (pixel value), in the frequency two-dimensional data. In the frequency two-dimensional data, a pixel continuous length of a pixel region corresponding to an edge portion of the subject corresponds to the amplitude of vibration of the subject.

In this manner, the frequency and the amplitude of the vibration of the subject are calculated as the vibration information.

The display control unit 40 controls the display unit 23 to cause the display unit 23 to display a display image obtained by visualizing a vibration state of the subject, on the basis of the vibration information generated by the vibration detection unit 30. Specifically, the display control unit 40 controls displaying of a display image having the display information according to the frequency information for each pixel position, on the basis of the frequency two-dimensional data generated by the frequency calculation unit 31.

<3. Flow of Vibration Detection Processing>

Next, with reference to a flowchart of FIG. 2, a flow of vibration detection processing by the vibration detection unit 30 will be described.

In step S11, the vibration detection unit 30 acquires event data (x, y, t, p) input from the input unit 21. From the EVS 11, event data for each pixel in which an event (a luminance change in the pixel) has occurred is output in units of u seconds.

In step S12, the frequency calculation unit 31 calculates a frequency of vibration of the subject on the basis of the event data output from the EVS 11 in a predetermined period.

A specific example of frequency calculation will be described with reference to FIG. 3.

Figure 3:
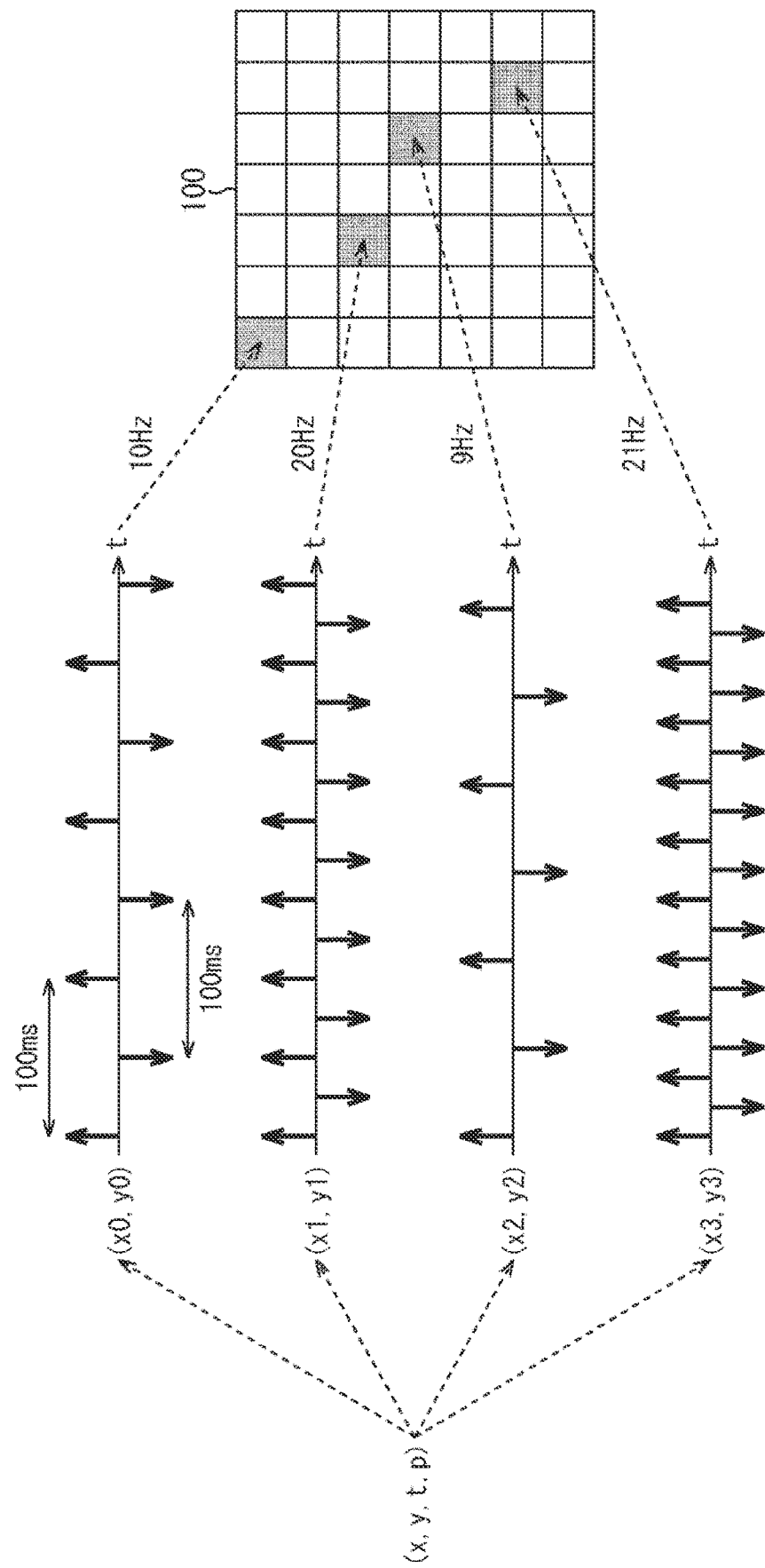
FIG. 3 is a view for explaining generation of frequency two-dimensional data.

In the example of FIG. 3, event data of four pixels at pixel positions (x0, y0), (x1, y1), (x2, y2), and (x3, y3) is acquired as event data (x, y, t, p) of a predetermined period.

In FIG. 3, a time series of the polarity p of an event having occurred at each pixel position is indicated by an upward arrow and a downward arrow. The upward arrow indicates that a luminance value of the pixel has increased by a predetermined threshold value or more, and the downward arrow indicates that a luminance value of the pixel has decreased by a predetermined threshold value or more.

Here, frequency information (a frequency of the subject corresponding to the pixel) is calculated on the basis of an interval of a time t at which the event with the same polarity has occurred at the same pixel position.

For example, at the pixel position (x0, y0), an event (an increase in luminance value) indicated by the upward arrow occurs at intervals of 100 ms, and similarly, an event (a decrease in luminance value) indicated by the downward arrow also occurs at intervals of 100 ms. In this case, since events with the same polarity occur every 100 ms, the frequency of vibration of the subject corresponding to the pixel position (x0, y0) is calculated to be 10 Hz.

In the example of FIG. 3, similarly, a frequency of vibration of the subject corresponding to the pixel position (x1, y1) is calculated to be 20 Hz, a frequency of vibration of the subject corresponding to the pixel position (x2, y2) is calculated to be 9 Hz, and a frequency of vibration of the subject corresponding to the pixel position (x3, y3) is calculated to be 21 Hz.

Then, frequency two-dimensional data 100 having frequency information is generated for every pixel position (x, y). The frequency two-dimensional data 100 is generated every predetermined period.

Note that, in the example of FIG. 3, it has been assumed that an event (an increase in luminance value) indicated by the upward arrow and an event (a decrease in luminance value) indicated by the downward arrow alternately occur at each pixel position. However, in practice, there is a case where events with the same polarity occur consecutively.

Figure 4:
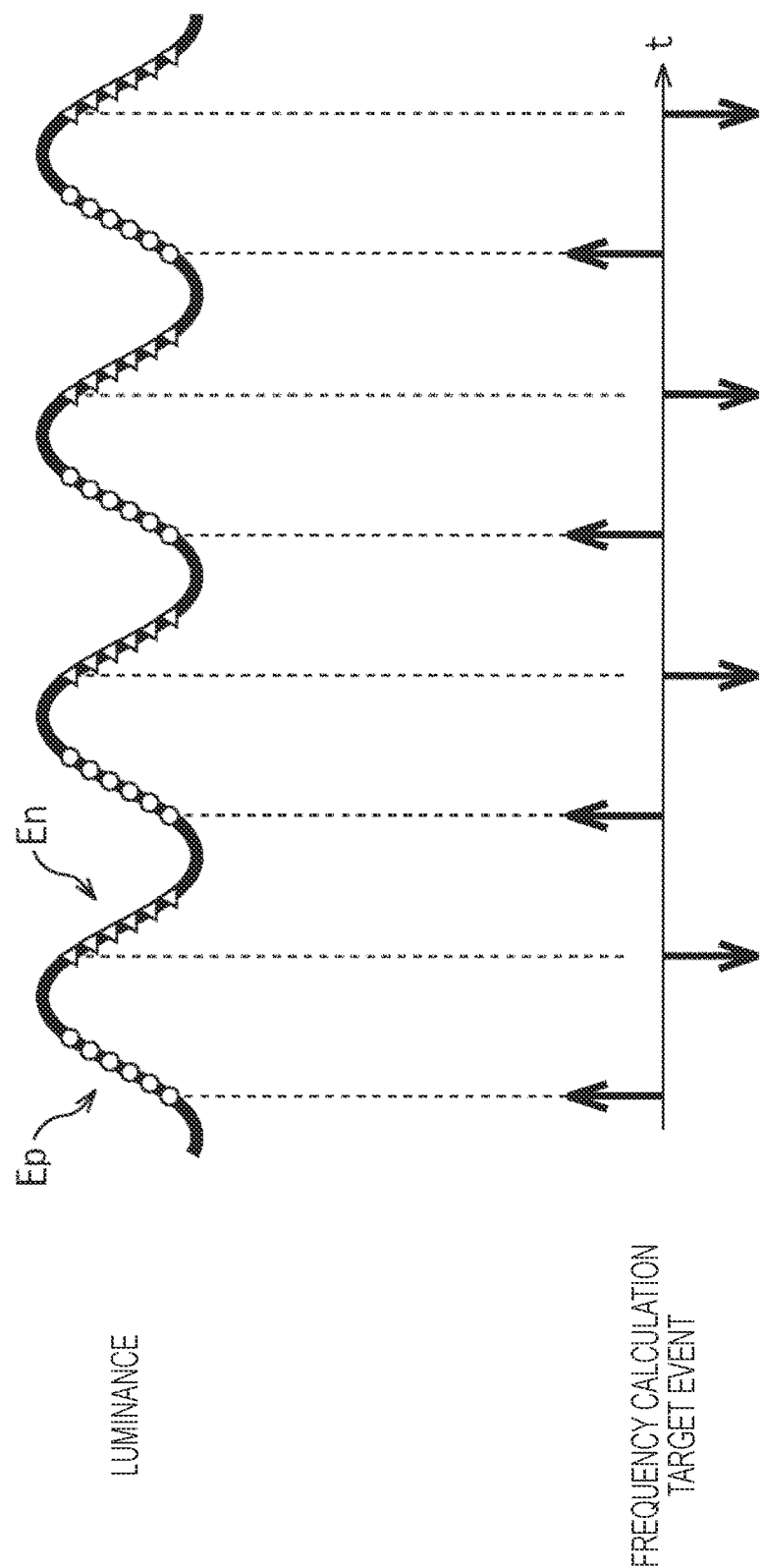
FIG. 4 is a view for explaining a specific example of frequency calculation.

For example, as illustrated in an upper part of FIG. 4, it is assumed that luminance at a certain pixel position changes in a sinusoidal shape. In this case, an event Ep indicating an increase in luminance value consecutively occurs as indicated by circles when the luminance value is increasing, and an event En indicating an increase in luminance value consecutively occurs as indicated by triangles when the luminance value is decreasing.

As described above, in a case where events with the same polarity occur consecutively, frequency information is calculated on the basis of an interval of a time at which a frequency calculation target event has occurred, by setting a temporally leading event among consecutive events with the same polarity as the frequency calculation target event.

As described above, when the frequency information for each pixel position is calculated and the frequency two-dimensional data is generated, in step S13, the amplitude calculation unit 32 calculates an amplitude of vibration of the subject on the basis of the frequency two-dimensional data.

A specific example of amplitude calculation will be described with reference to FIG. 5.

First, pixels having the same frequency information in the frequency two-dimensional data are grouped into one pixel region. In the example of FIG. 5, three pixels are grouped into one pixel region PG. The subject corresponding to the pixel region PG grouped in this manner vibrates at the same frequency, so that the subject is estimated as one subject.

Moreover, as illustrated on a right side of the figure, if the times t at which the event having the polarity indicated by the upward arrow and the event having the polarity indicated by the downward arrow occur are temporally consecutive as an event having occurred in each pixel corresponding to the pixel region PG, the subject corresponding to the pixel region PG is regarded as one subject. Note that, as illustrated in FIG. 5, occurrence intervals of events with different polarities vary depending on pixel positions corresponding to an edge portion of the vibrating subject. For example, as the pixel is closer to a vertex of the amplitude of vibration of the edge portion, the occurrence interval of the events with different polarities becomes shorter.

Figure 5:
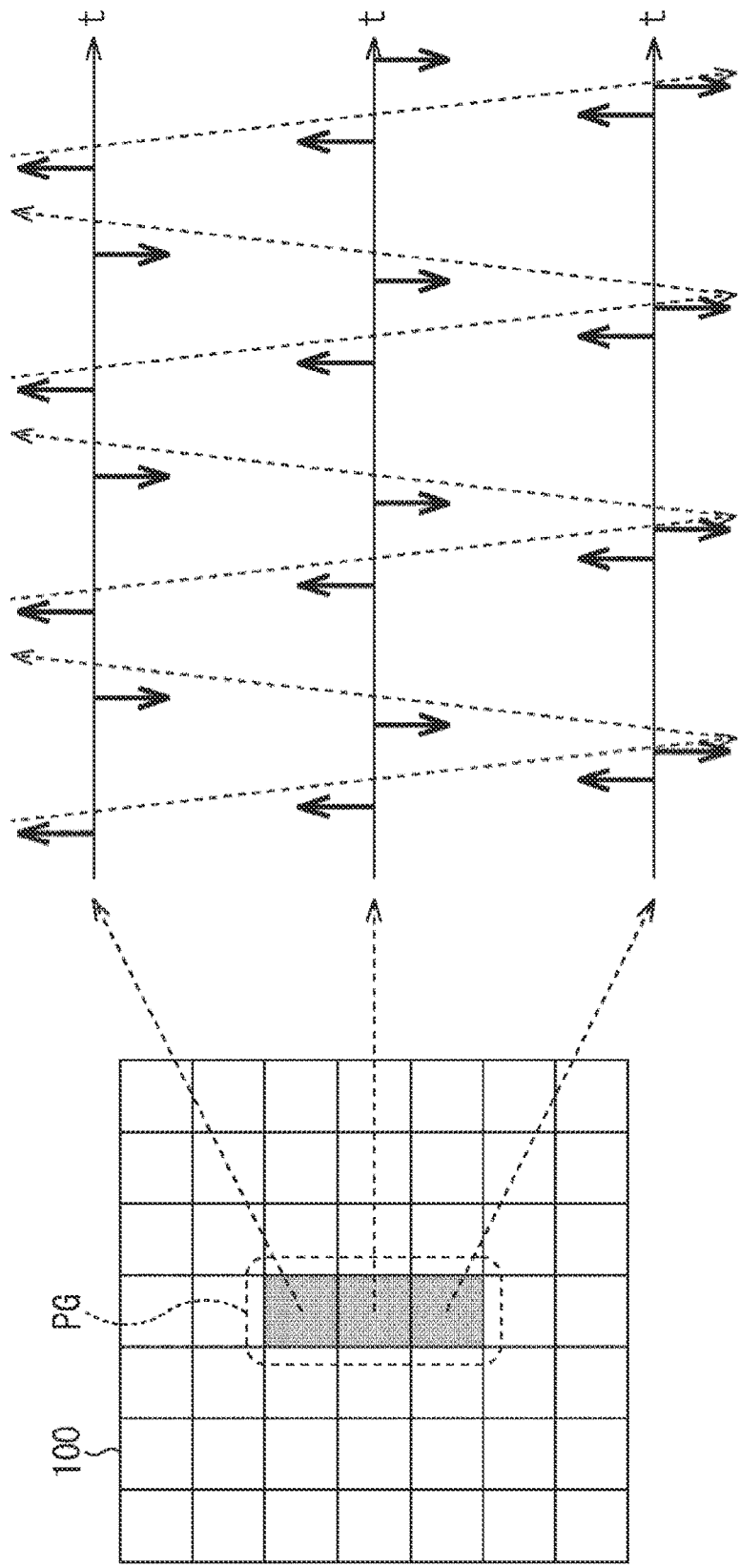
FIG. 5 is a view for explaining a specific example of amplitude calculation.

In the example of FIG. 5, the amplitude of vibration of the subject is calculated with the pixel region PG as one subject. The amplitude of the vibration is calculated on the basis of a pixel continuous length (three pixels in the example of FIG. 5) of the pixel region PG. That is, on an image captured by the EVS 11, the subject corresponding to the pixel region PG vibrates with an amplitude of three pixels. Therefore, the amplitude calculated here is not the amplitude of the vibration of the subject in the real space.

Figure 2:
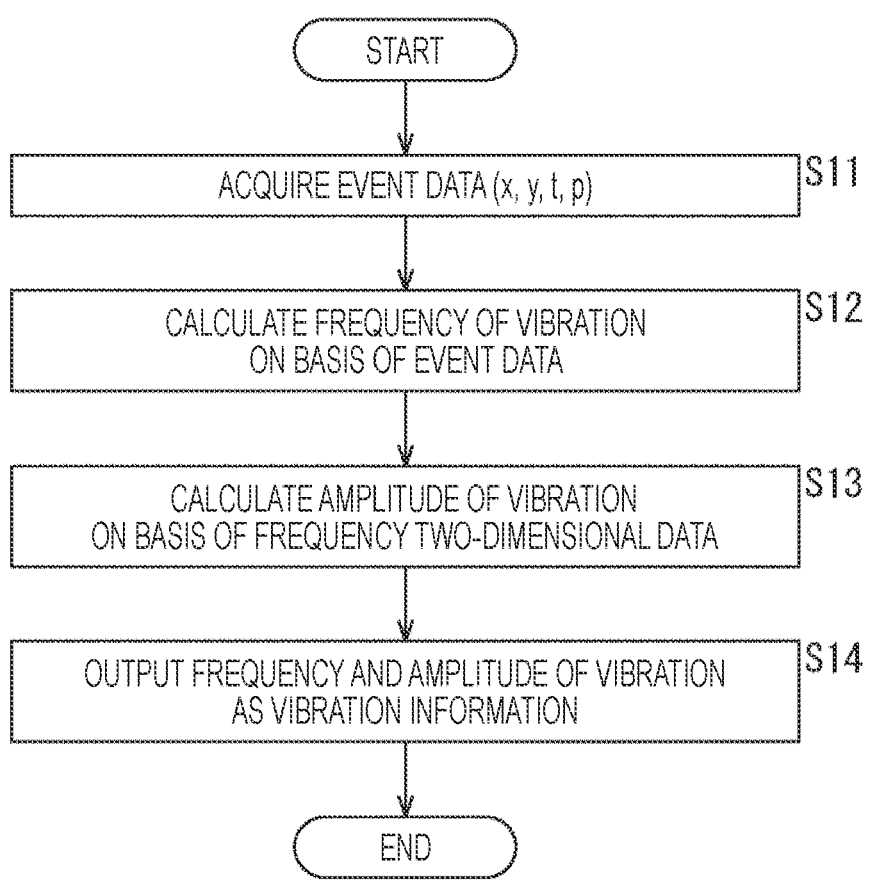
FIG. 2 is a flowchart illustrating a flow of vibration detection processing.

Meanwhile, returning to the flowchart of FIG. 2, in step S14, the vibration detection unit 30 outputs the frequency and the amplitude of the vibration of the subject calculated as described above as vibration information.

According to the above processing, the vibration of the subject can be detected on the basis of the event data output from the EVS. Therefore, a plurality of vibration sensors and a high-cost light source are not required, and displacement of multiple points can be measured simultaneously in a non-contact manner.

Furthermore, since the event data output from the EVS is used, it is possible to perform sampling at a sufficient sampling frequency with lower power consumption, as compared with a technique using time-series images output by the frame-based method.

In this way, more suitable vibration monitoring can be achieved by vibration detection based on the event data from the EVS.

<4. Displaying of Frequency Image>

Next, a description is given to displaying of a frequency image which is a display image obtained by visualizing the frequency two-dimensional data described above.

Figure 6:
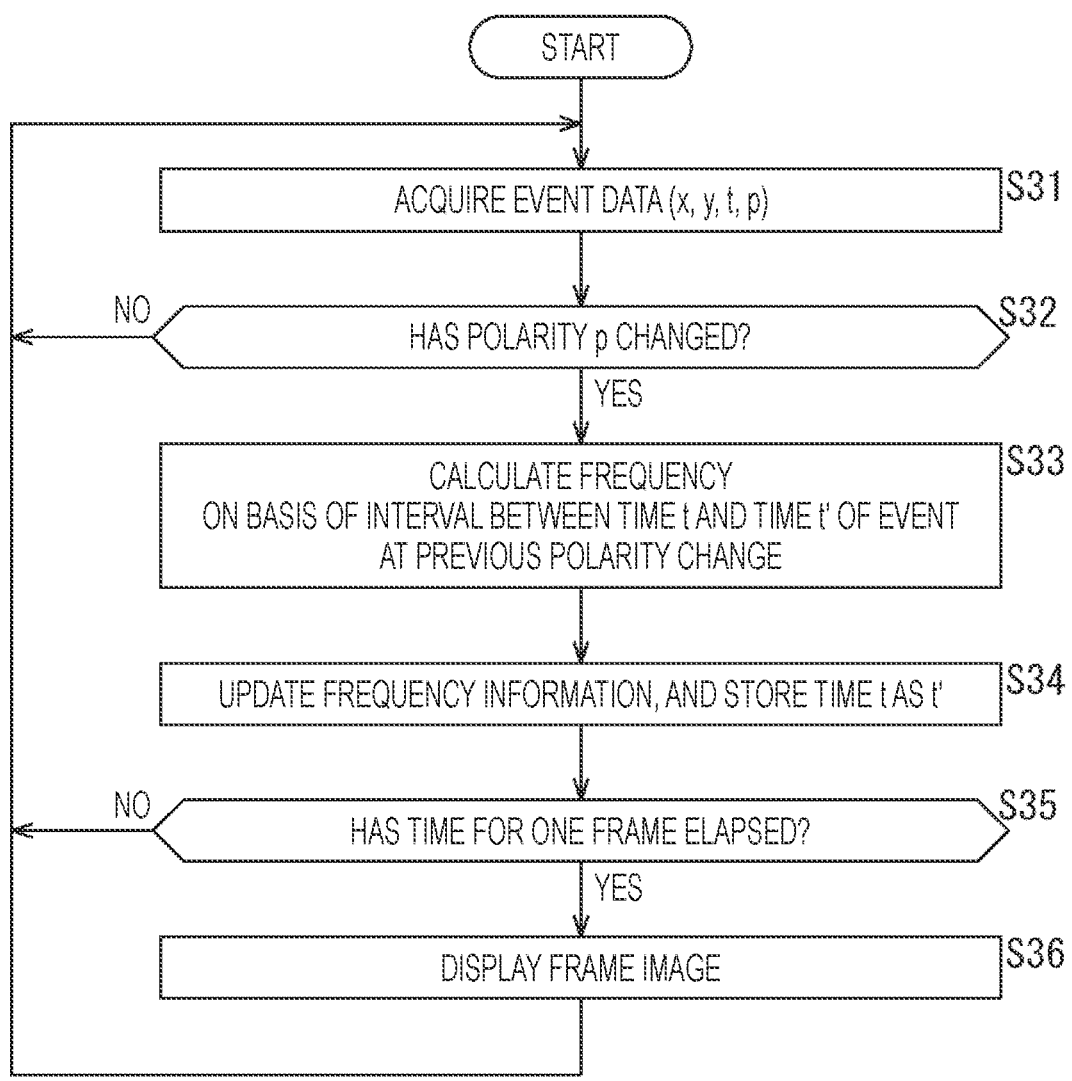
FIG. 6 is a flowchart illustrating a flow of displaying of a frequency image.

FIG. 6 is a flowchart illustrating a flow of displaying of a frequency image. In the processing of FIG. 6, the processing of steps S31 to S34 is executed every time an event occurs in each pixel for each of all pixel positions (x, y). Here, it is assumed that the frequency image is displayed at a frame rate of 30 fps, for example.

In step S31, the vibration detection unit 30 acquires event data (x, y, t, p) input from the input unit 21. As described above, from the EVS 11, event data for each pixel in which an event (a luminance change in the pixel) has occurred is output in units of p seconds.

In step S32, the vibration detection unit 30 determines whether or not the polarity p has changed in the event data output every time an event occurs. When it is determined that the polarity p has not changed, the processing returns to step S31. When it is determined that the polarity p has changed, the processing proceeds to step S33.

That is, in step S32, in a case where events with the same polarity occur consecutively, it is determined whether or not the event is a temporally leading event (the frequency calculation target event) among consecutive events with the same polarity.

In step S33, the frequency calculation unit 31 calculates a frequency on the basis of an interval between a time t of a current event and a time t' of an event at a previous polarity change.

In step S34, the frequency calculation unit 31 updates the frequency information of the frequency two-dimensional data described with reference to FIG. 3 with the calculated frequency for each pixel position (x, y), and stores the time t of the current event as the time t' of the previous event.

In step S35, the frequency calculation unit 31 determines whether or not time for one frame, that is, 1/30 seconds in this example has elapsed. When it is determined that the time for one frame has not elapsed, the frequency calculation for each pixel position (x, y) and the update of the frequency information are repeated.

Whereas, when it is determined in step S35 that the time for one frame has elapsed, the frequency calculation unit 31 supplies, to the display control unit 40, frequency two-dimensional data including frequency information most recently updated for each pixel position (x, y).

Here, instead of the frequency calculated most recently for each pixel position (x, y), an average value of frequencies calculated during the time for one frame for each pixel position (x, y) may be used as the frequency information.

In step S36, on the basis of the frequency two-dimensional data from the frequency calculation unit 31, the display control unit 40 causes the display unit 23 to display a frame image of a frequency image having display information corresponding to the frequency information for every pixel position (x, y).

The display information may be color information or luminance information. In a case where the display information is color information, a frame image in which pixel regions are color-coded for each frequency is displayed. In a case where the display information is luminance information, for example, a frame image having a brighter pixel region for a higher frequency is displayed.

After the frame image is displayed in this manner, the processing returns to step S31, and the subsequent processing is repeated as processing for displaying a next frame image.

According to the above processing, it is possible to visually express a vibration detection result based on event data from the EVS.

<5. Problem and Countermeasure in Amplitude Calculation>

According to the vibration detection processing described above, a frequency and an amplitude of vibration of a subject can be calculated as vibration information, on the basis of event data output from the EVS. However, the amplitude calculated in the vibration detection processing is not an amplitude of vibration of the subject in the real space.

First, vibration of a subject in an image captured by the EVS 11 varies depending on a vibration direction of the subject and a direction from which the image of the subject is captured (an image-capturing direction of the subject).

On the other hand, the amplitude calculation unit 32 calculates the amplitude of the vibration of the subject in the real space on the basis of a relationship between the vibration direction of the subject and the image-capturing direction of the EVS camera 10.

Figure 7:
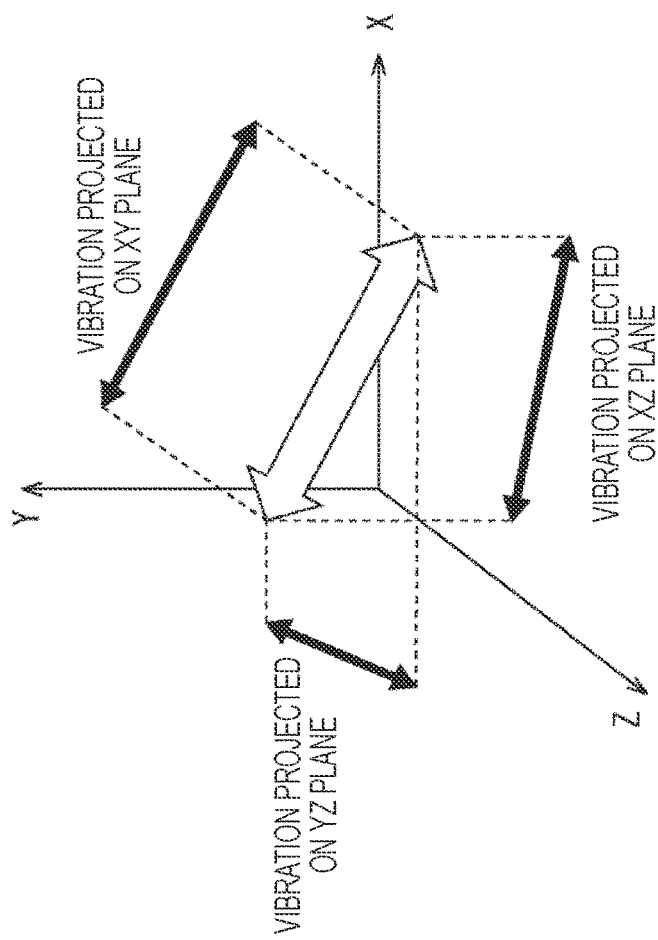
FIG. 7 is a view for explaining amplitude calculation of vibration in a real space.

Specifically, by capturing an image of a subject as a monitoring target for vibration from three directions, as illustrated in FIG. 7, the amplitude calculation unit 32 calculates an amplitude of each of vibration projected on an XY plane, vibration projected on a YZ plane, and vibration projected on an XZ plane. Then, the amplitude calculation unit 32 obtains an amplitude of vibration in a three-dimensional space on the basis of the amplitude of each vibration projected on the three planes.

Next, the amplitude obtained as described above is an amplitude in units of pixels on an image captured by the EVS 11, and is not an amplitude of a real scale in the real space.

Whereas, the amplitude calculation unit 32 calculates the amplitude of the real scale of the vibration of the subject in the real space on the basis of a relationship between a distance to the subject and a lens focal length of the EVS camera 10.

Figure 8:
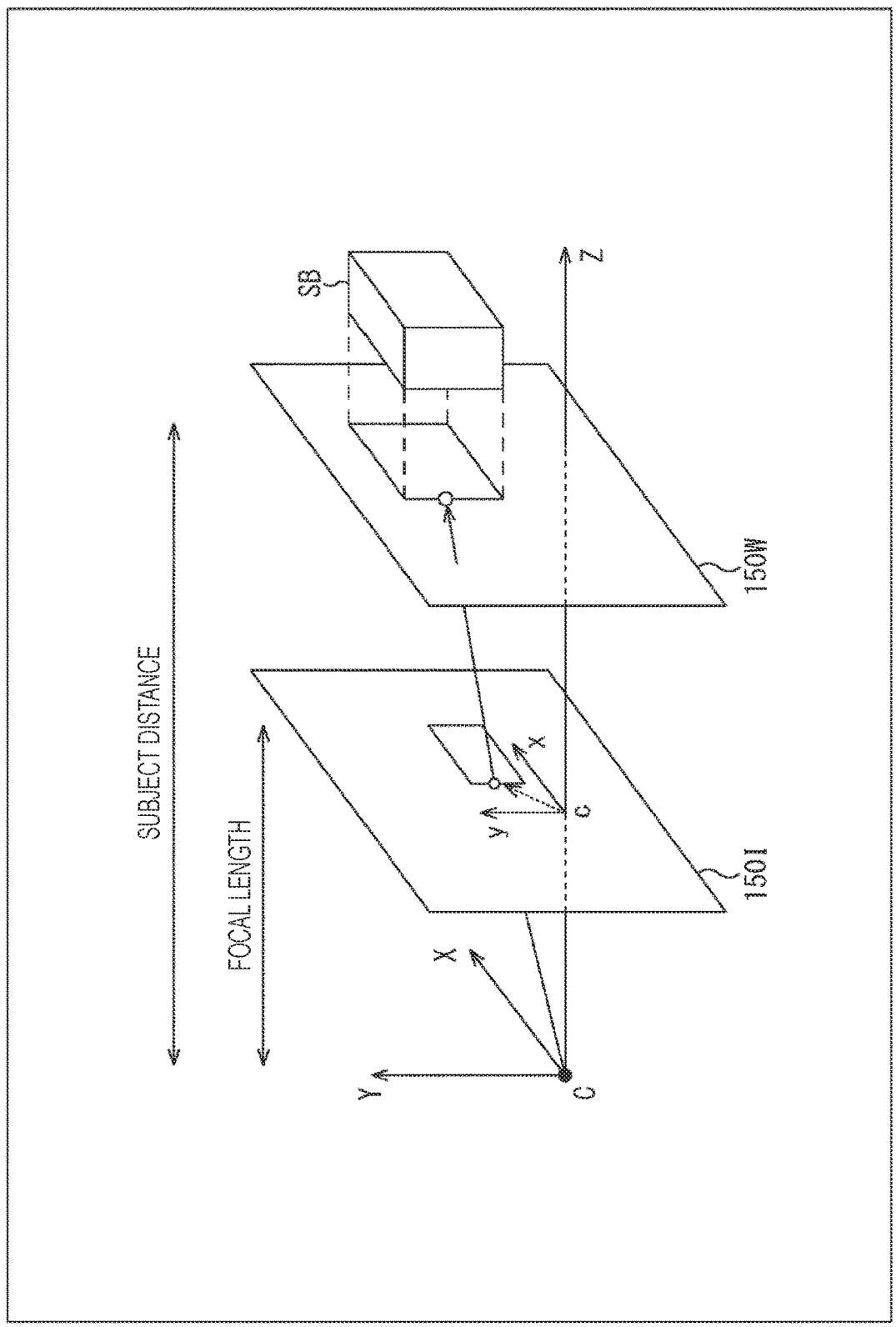
FIG. 8 is a view for explaining amplitude calculation of vibration in a real space.

As illustrated in FIG. 8, the amplitude calculation unit 32 converts coordinates on an image coordinate system (x, y) projected on an image plane 1501 into coordinates on a camera coordinate system (X, Y) on the basis of the lens focal length. Then, the amplitude calculation unit 32 converts the coordinates on the camera coordinate system (X, Y) into coordinates on a real space plane 150W in a world coordinate system, on the basis of a distance from the EVS camera 10 to a subject SB. As a result, the amplitude of the pixel unit on the image captured by the EVS 11 is converted into the amplitude of the real scale.

In this way, the amplitude of the vibration of the subject in the real space can be calculated.

<6. Frequency Calculation by Restoring Luminance Change>

In the above description, the frequency information has been assumed to be calculated on the basis of an interval of the time t at which an event with the same polarity occurs at the same pixel position.

Without limiting to this, the frequency information can also be calculated by restoring a luminance change for each pixel on the basis of a time series of a polarity included in event data.

The restoration of the luminance change will be described with reference to FIG. 9.

Figure 9:
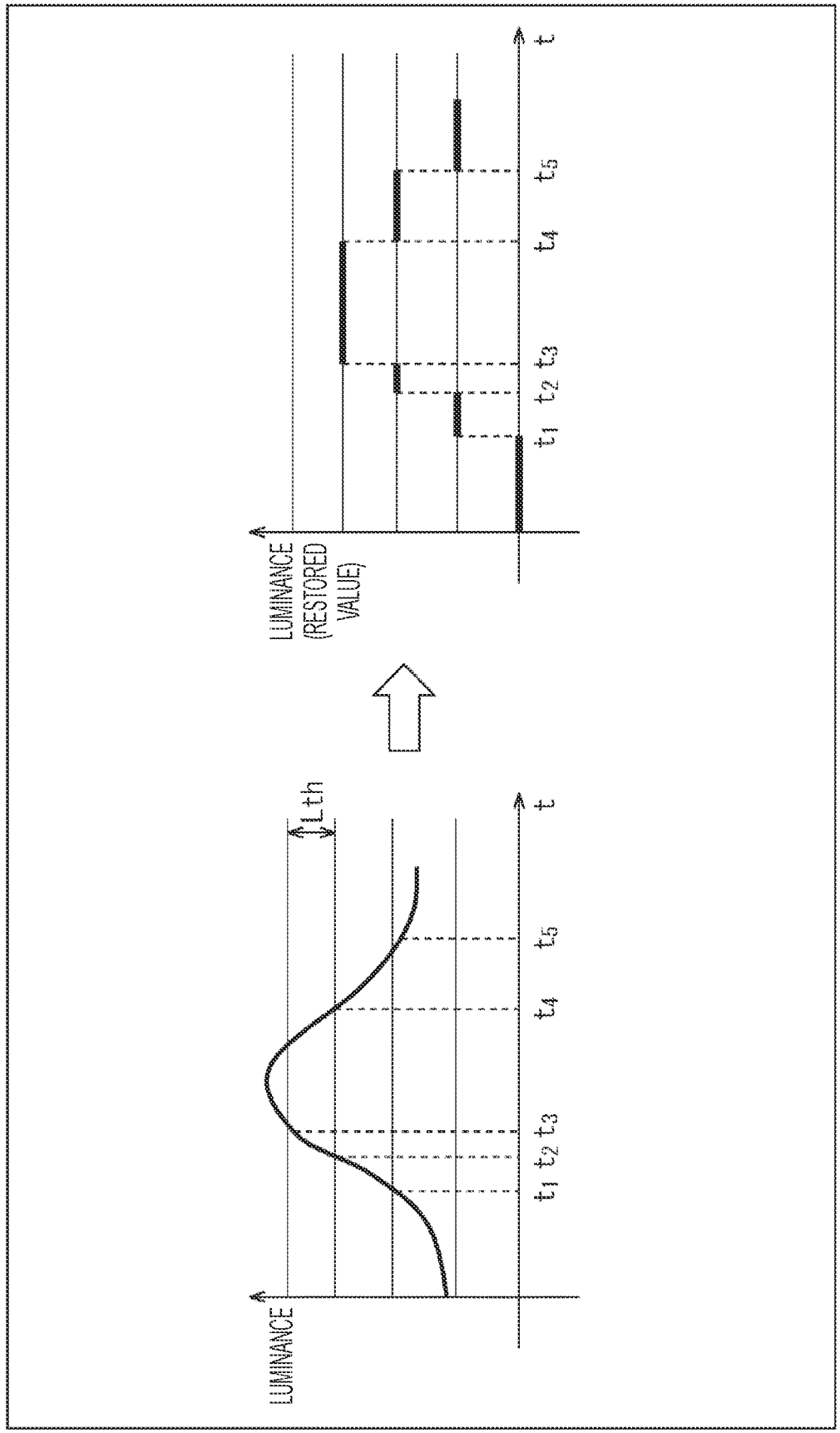
FIG. 9 is a view for explaining restoration of a luminance change.

A left graph in FIG. 9 illustrates an example of a luminance change at a predetermined pixel position (x, y).

As described above, event data is output when a luminance value changes by a predetermined threshold value or more.

In the left graph of FIG. 9, a luminance value of a pixel increases by a threshold value Lth or more at each of times $t_1$, $t_2$, and $t_3$, and the luminance value of the pixel decreases by the threshold value Lth or more at each of times $t_4$ and $t_5$. That is, an event with the polarity indicated by the upward arrow in FIG. 3 occurs at each of the times $t_1$, $t_2$, and $t_3$, and an event with the polarity indicated by the downward arrow in FIG. 3 occurs at each of the times $t_4$ and $t_5$.

Here, an occurrence of the event with the polarity indicated by the upward arrow is defined as addition of the luminance value by an amount of the threshold value Lth, and an occurrence of the event with the polarity indicated by the downward arrow is defined as subtraction of the luminance value by an amount of the threshold value Lth. Then, the luminance change illustrated in the left graph of FIG. 9 is restored as a stepwise luminance change as illustrated in a right graph of FIG. 9.

That is, the frequency calculation unit 31 restores the luminance change for each pixel as illustrated in FIG. 9, on the basis of a time series of the polarity included in the event data. Then, the frequency calculation unit 31 can calculate frequency information by performing frequency analysis on the restored luminance change, by using fast Fourier transform (FFT).

In the example described above, as the threshold value Lth set in the EVS 11 is smaller, the luminance change can be restored more accurately. However, in a case where the threshold value Lth is reduced, noise is also increased. Therefore, noise removal processing may be performed on the restored luminance change.

<7. Frequency Separation in Case where EVS Camera is Vibrating>

In a case where the EVS camera 10 that captures an image of a subject as a monitoring target for vibration is vibrating, vibration detected by the vibration detection unit 30 includes a mixture of vibration of the subject and vibration of the EVS camera 10. In this case, in order to detect only the vibration of the subject, it is necessary to perform frequency separation on the vibration detected by the vibration detection unit 30.

Figure 10:
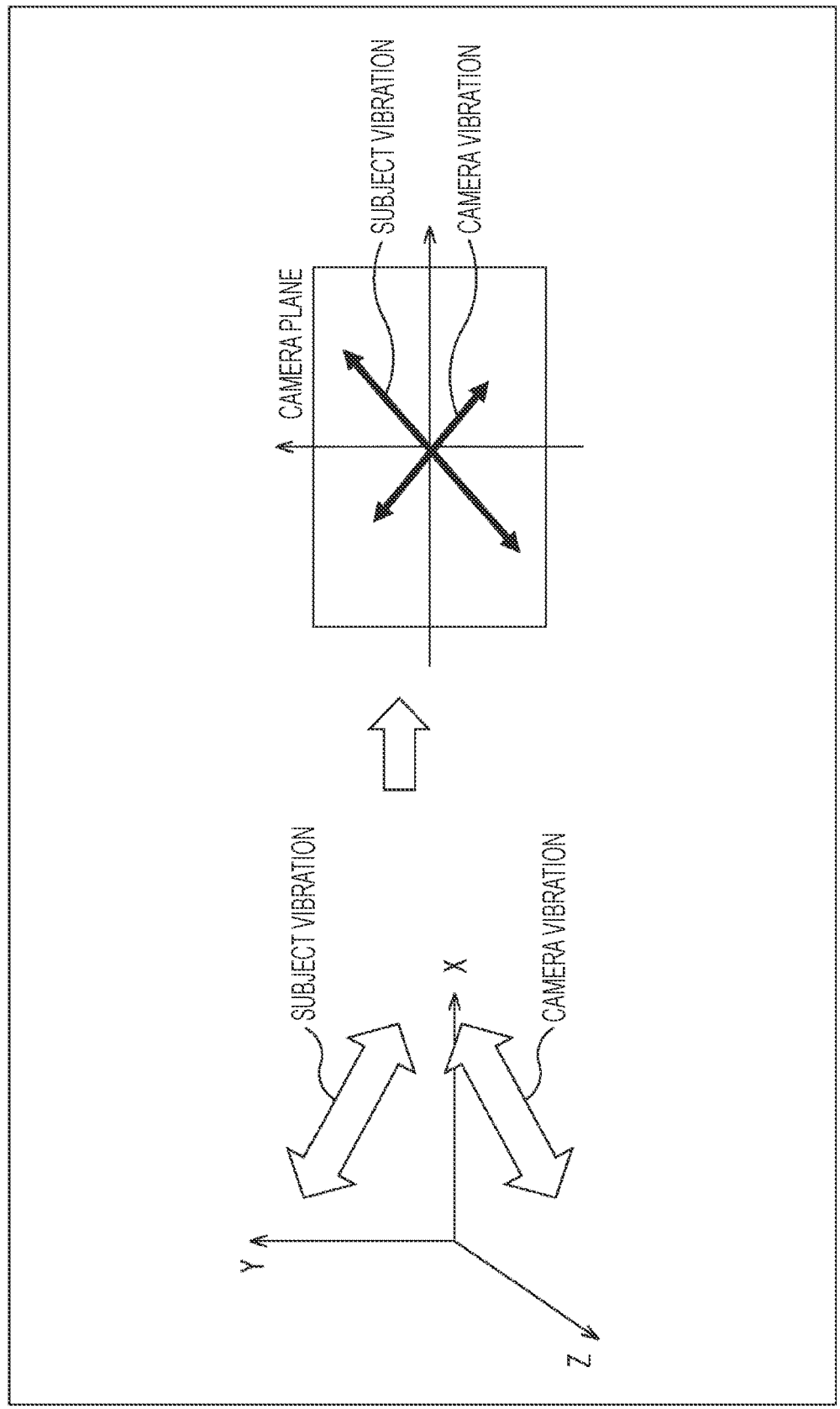
FIG. 10 is a view illustrating an example of frequency separation in a case where an EVS camera is vibrating.

For example, as illustrated in a left figure of FIG. 10, in a case where the subject and the EVS camera 10 vibrate in different directions from each other in a three-dimensional space, the EVS camera 10 is calibrated in an image-capturing direction in which the subject vibration and the camera vibration can be separated.

Specifically, as illustrated in a right figure of FIG. 10, the EVS camera 10 is calibrated in an image-capturing direction in which the subject vibration and the camera vibration projected on a camera plane are orthogonal to each other.

As a result, it is possible to detect only the vibration of the subject.

Furthermore, in a case where only the subject is vibrating and in a case where the subject and the EVS camera 10 are vibrating, a luminance change in the subject is greatly different. Therefore, in a case where it is difficult to perform the frequency separation with the vibration direction as illustrated in FIG. 10, it is also possible to perform the frequency separation based on a luminance change for each pixel restored on the basis of the event data.

Figure 11:
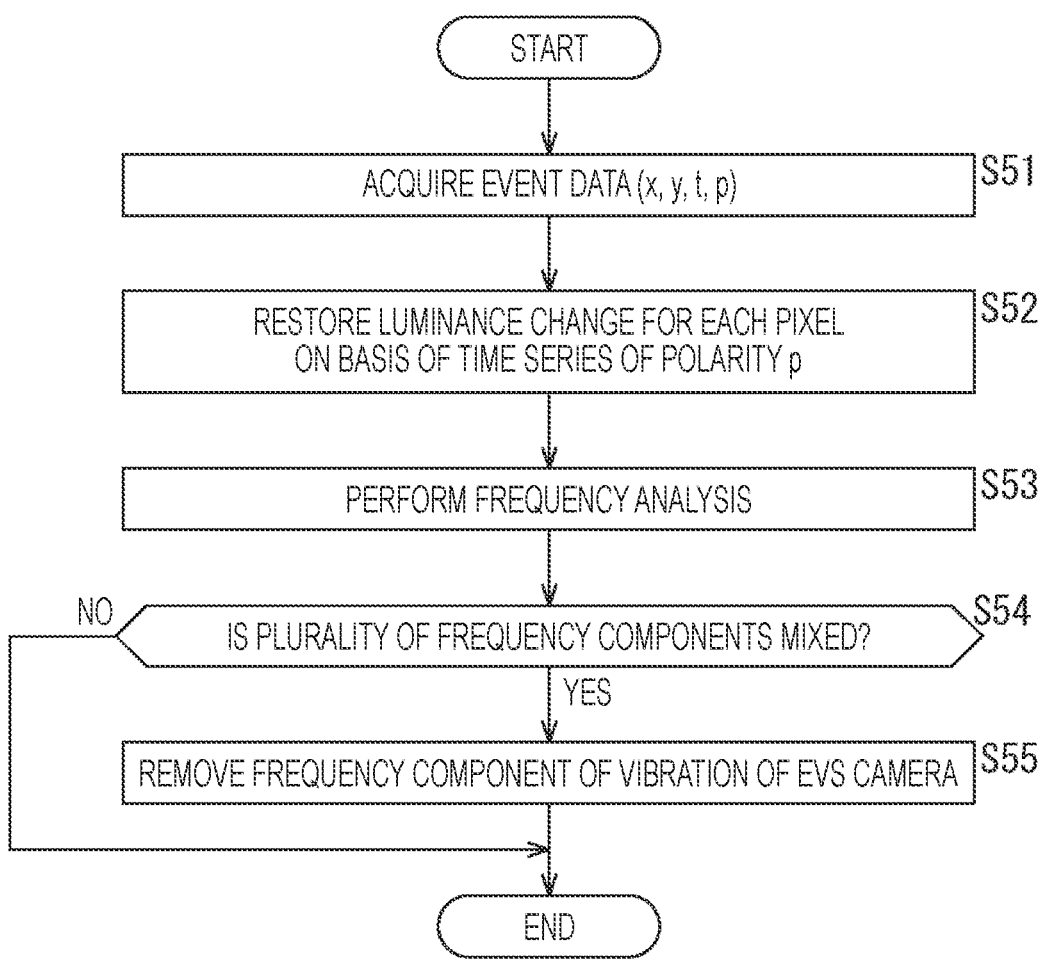
FIG. 11 is a flowchart for explaining a flow of frequency separation.

FIG. 11 is a flowchart illustrating a flow of frequency separation using a luminance change for each pixel restored on the basis of event data.

In step S51, the vibration detection unit 30 acquires event data (x, y, t, p) input from the input unit 21. As described above, from the EVS 11, event data for each pixel in which an event (a luminance change in the pixel) has occurred is output in units of p seconds. Here, it is assumed that event data for a certain period is acquired.

In step S52, as described with reference to FIG. 9, the frequency calculation unit 31 restores a luminance change for each pixel on the basis of a time series of the polarity p included in the acquired event data.

In step S53, the frequency calculation unit 31 performs frequency analysis on the restored luminance change.

In step S54, the frequency calculation unit 31 determines whether or not a plurality of frequency components (specifically, two frequency components) is mixed in a result of the frequency analysis. When it is determined that a plurality of frequency components is mixed, the processing proceeds to step S55.

In step S55, the frequency calculation unit 31 removes a frequency component of vibration of the EVS camera 10 from the plurality of frequency components. The frequency component of the vibration of the EVS camera 10 is obtained by detecting vibration of the EVS camera 10 from event data obtained by capturing an image of a stationary subject with the vibrating EVS camera 10 in advance.

Whereas, when it is determined that the plurality of frequency components is not mixed, step S55 is skipped. In this case, the result of the frequency analysis is a frequency of vibration of the subject or a frequency of vibration of the EVS camera 10.

As described above, even in a case where the frequency separation by the vibration direction is difficult, the frequency separation can be performed on the basis of a luminance change for each pixel restored on the basis of the event data.

Note that a combination of vibration of the subject and vibration of the EVS camera 10 and a luminance change due to these vibrations may be learned by simulating in various patterns. As a result, the vibration of the subject and the vibration of the EVS camera 10 can be easily detected on the basis of the luminance change restored on the basis of the event data.

<8. Configuration Example of EVS Camera>

In the above description, the vibration detection unit 30 is implemented by the processing unit 22 of the information processing apparatus 20 configured as a computer, but may be implemented inside the EVS camera.

Figure 12:
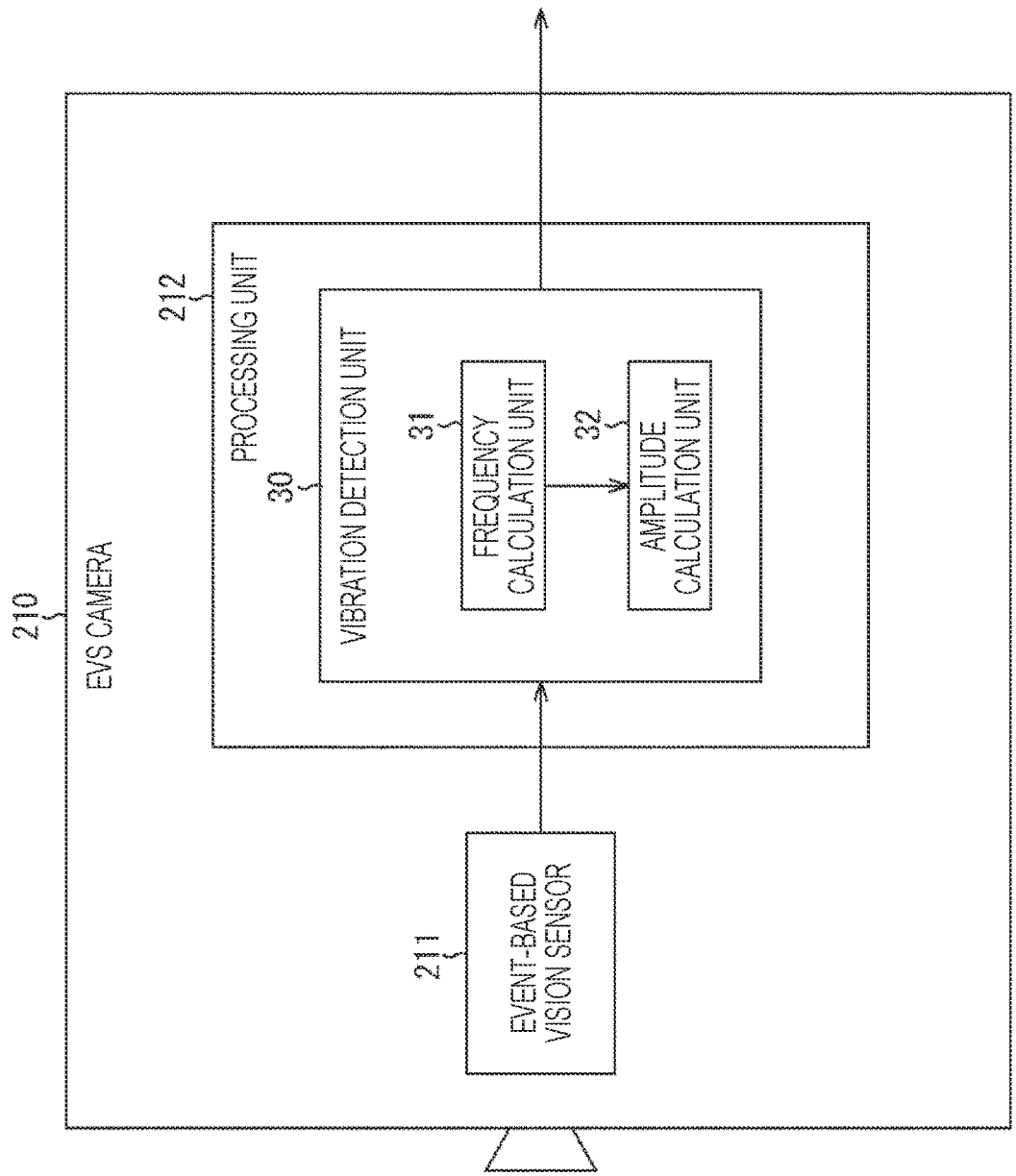
FIG. 12 is a diagram illustrating a configuration example of an EVS camera according to an embodiment of the present disclosure.

FIG. 12 is a diagram illustrating a configuration example of an EVS camera which is one of embodiments of the present disclosure.

An EVS camera 210 of FIG. 12 includes an event-based vision sensor (EVS) 211 and a processing unit 212.

Similarly to the EVS 11 of FIG. 1, the EVS 211 detects a luminance change in a pixel as an event, and outputs event data for each pixel in which an event has occurred.

The processing unit 212 includes a processor such as a CPU. The processing unit 212 implements the vibration detection unit 30 by executing a predetermined program. Vibration information generated by the vibration detection unit 30 and indicating a vibration state of a subject is output to an external device or the like connected to the EVS camera 210.

The processor constituting the processing unit 212 may be integrated into one chip together with the EVS 211, or may be mounted on a companion chip or the like electrically connected to the EVS 211, for example.

Figure 13:
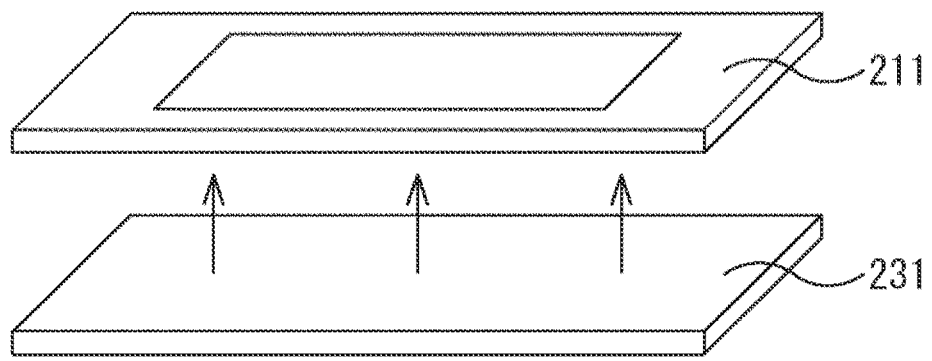
FIG. 13 is a view illustrating an example of a companion chip.

In a case where the processing unit 212 is mounted on a companion chip different from the EVS 211, as illustrated in FIG. 13, the EVS 211 and a companion chip 231 can also be electrically connected to each other by being stacked.

<9. Application Example of Technology According to Present Disclosure>

Hereinafter, application examples of the technology according to the present disclosure will be described.

(Failure Prediction System)

Figure 14:
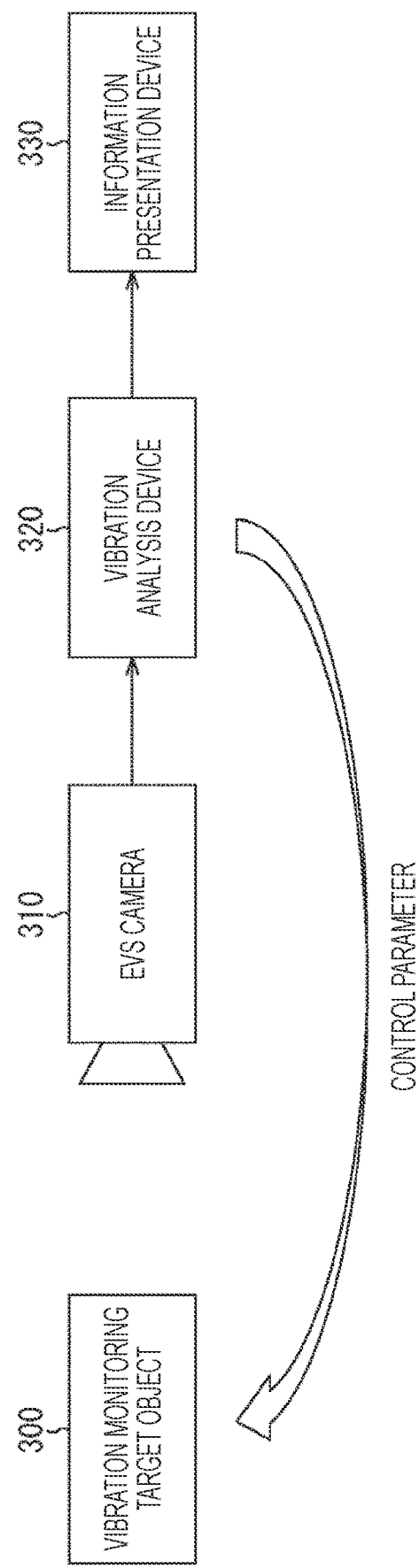
FIG. 14 is a diagram for explaining an application example of the technology according to the present disclosure.

FIG. 14 is a diagram illustrating a configuration example of a failure prediction system.

The failure prediction system in FIG. 14 monitors vibration of a vibration monitoring target object 300 to predict the presence or absence of a failure of the vibration monitoring target object 300.

The vibration monitoring target object 300 is, for example, multiple pieces of equipment and device installed in a factory or the like.

The failure prediction system in FIG. 14 includes an EVS camera 310, a vibration analysis device 320, and an information presentation device 330.

The EVS camera 310 corresponds to the EVS camera 10 in FIG. 1, and the vibration analysis device 320 and the information presentation device 330 correspond to the information processing apparatus 20 in FIG. 1.

The vibration analysis device 320 analyzes vibration of the vibration monitoring target object 300 on the basis of event data from the EVS camera 310. For example, the vibration analysis device 320 analyzes vibration of the vibration monitoring target object 300 by using a method such as time series analysis or an abnormality detection algorithm.

The information presentation device 330 presents information based on an analysis result of vibration obtained by the vibration analysis device 320. For example, in a case where abnormal vibration is detected in a part of the vibration monitoring target object 300, the information presentation device 330 performs, for example, emphasis display on a portion where abnormal vibration is detected or surrounds the portion with a frame, in a frequency image obtained by visualizing frequency two-dimensional data generated by the vibration analysis device 320. Furthermore, in this case, the information presentation device 330 may output a predetermined alarm by display or sound.

Furthermore, in a case where abnormal vibration is detected, as illustrated in FIG. 14, the vibration analysis device 320 may feed back a control parameter for controlling the vibration monitoring target object 300, to the vibration monitoring target object 300. The control parameter is, for example, a current value. a voltage value, or the like for driving the vibration monitoring target object 300.

Figure 15:
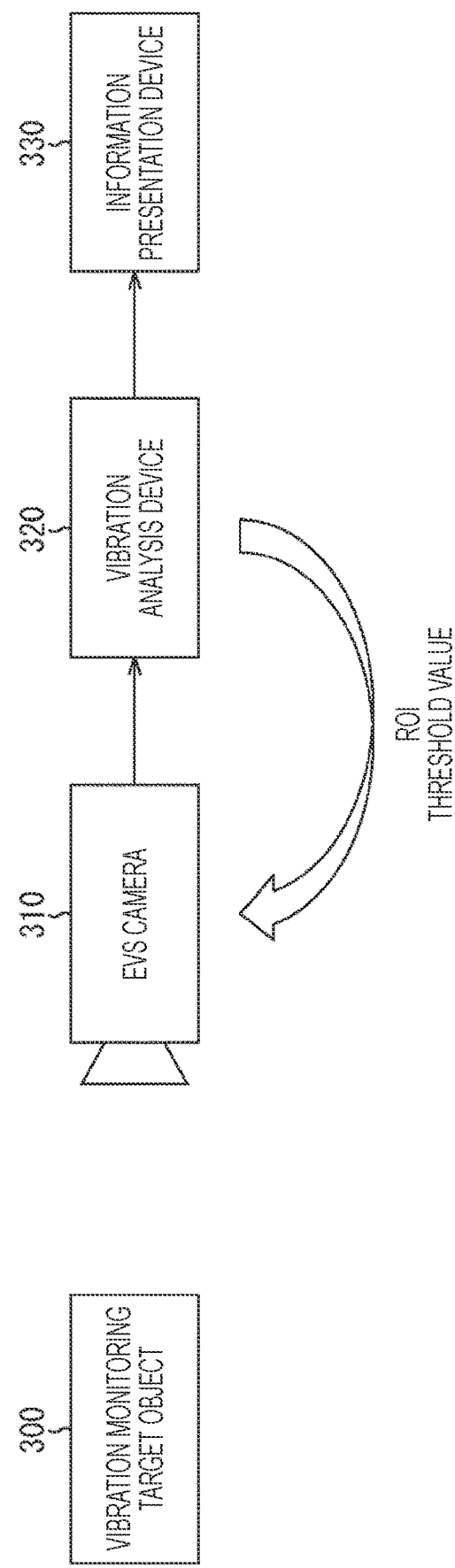
FIG. 15 is a diagram for explaining an application example of the technology according to the present disclosure.

Moreover, in a case where abnormal vibration is detected, as illustrated in FIG. 15, the vibration analysis device 320 may feed back a region of interest (ROI) and a threshold value for outputting event data, to the EVS camera 310.

By feeding back the ROI to the EVS camera 310, the EVS camera 310 can perform image-capturing with a pixel region where an event has occurred as a center, and can output the event data more efficiently.

Furthermore, by feeding back the threshold value to the EVS camera 310, the EVS camera 310 can more appropriately output event data for a luminance change, and it is possible to prevent erroneous detection and detection omission of vibration.

(Micro Vibration Detection System)

Figure 16:
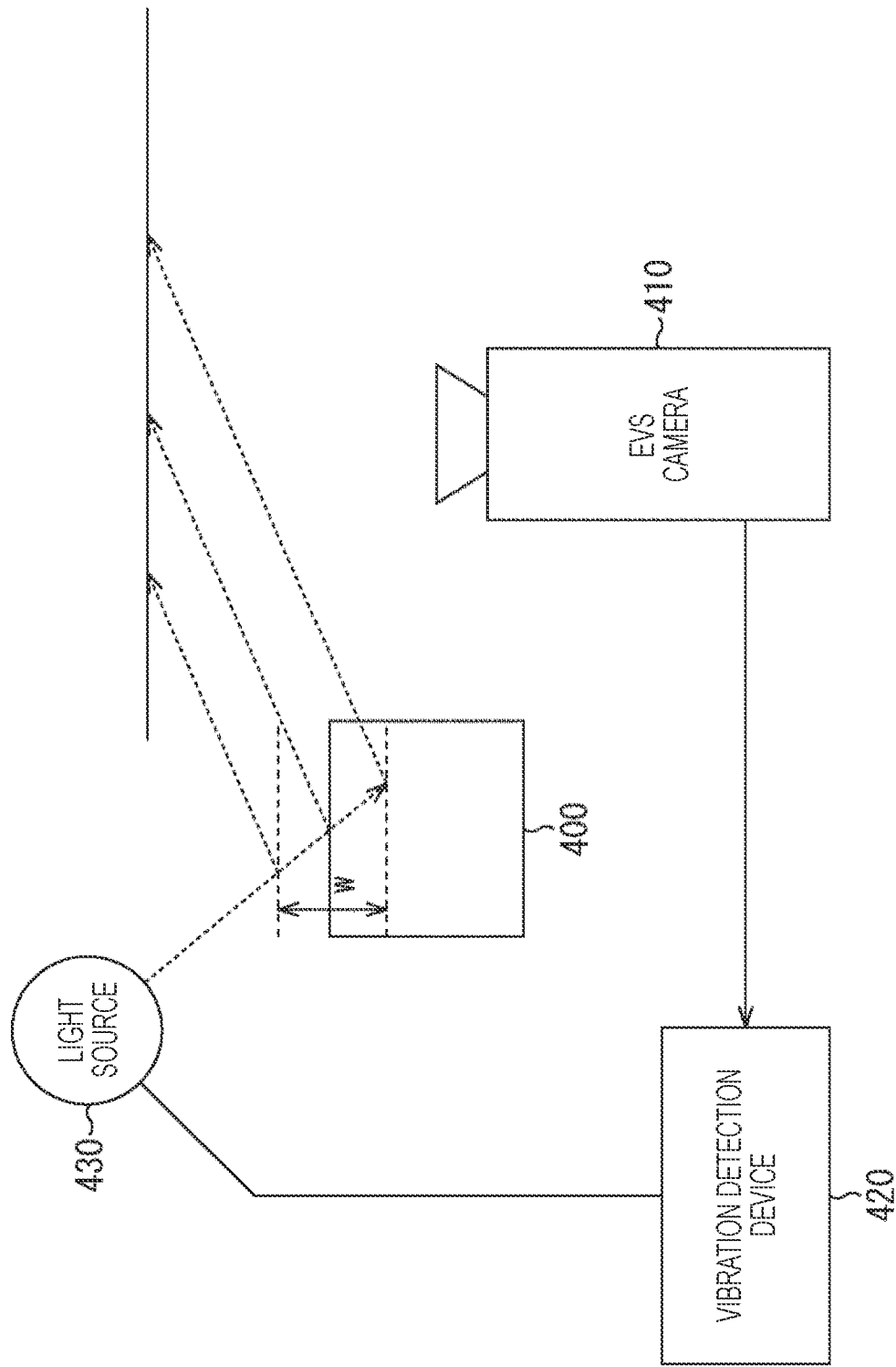
FIG. 16 is a diagram for explaining an application example of the technology according to the present disclosure.

FIG. 16 is a diagram illustrating a configuration example of a minute vibration detection system.

The minute vibration detection system in FIG. 16 monitors minute vibration of a vibration monitoring target object 400.

The minute vibration detection system in FIG. 16 includes an EVS camera 410, a vibration detection device 420, and an active light source 430.

The EVS camera 410 corresponds to the EVS camera 10 in FIG. 1, and the vibration detection device 420 corresponds to the information processing apparatus 20 in FIG. 1.

The vibration detection device 420 detects vibration of the vibration monitoring target object 400 on the basis of event data from the EVS camera 410.

The active light source 430 irradiates, with light, a surface of the vibration monitoring target object 400 that vibrates with a minute amplitude. The EVS camera 410 captures an image of, as a subject, reflected light reflected by the surface of the vibration monitoring target object 400.

In a case where an amplitude w of vibration of the vibration monitoring target object 400 is a change within one pixel in an image-capturing range of the EVS camera 410, the vibration is not detected even if an image of the vibration monitoring target object 400 is captured as a subject.

Therefore, by increasing the amplitude w (a region in which a luminance changes) of vibration of the vibration monitoring target object 400 with the reflected light reflected by the surface of the vibration monitoring target object 400, vibration of the vibration monitoring target object 400 can be detected.

Note that, as in the example of FIG. 16, in a case where there is one active light source 430, a vibration direction of the vibration monitoring target object 400 is not specified. However, by providing multiple active light sources 430, it is also possible to specify the vibration direction of the vibration monitoring target object 400.

<10. Configuration Example of Computer>

The series of processing described above can be executed by hardware or software. In a case where a series of processes is executed by the software, a program which forms the software is installed on a computer. Here, examples of the computer include a computer incorporated in dedicated hardware and, for example, a general-purpose personal computer capable of executing various functions when various programs are installed.

Figure 17:
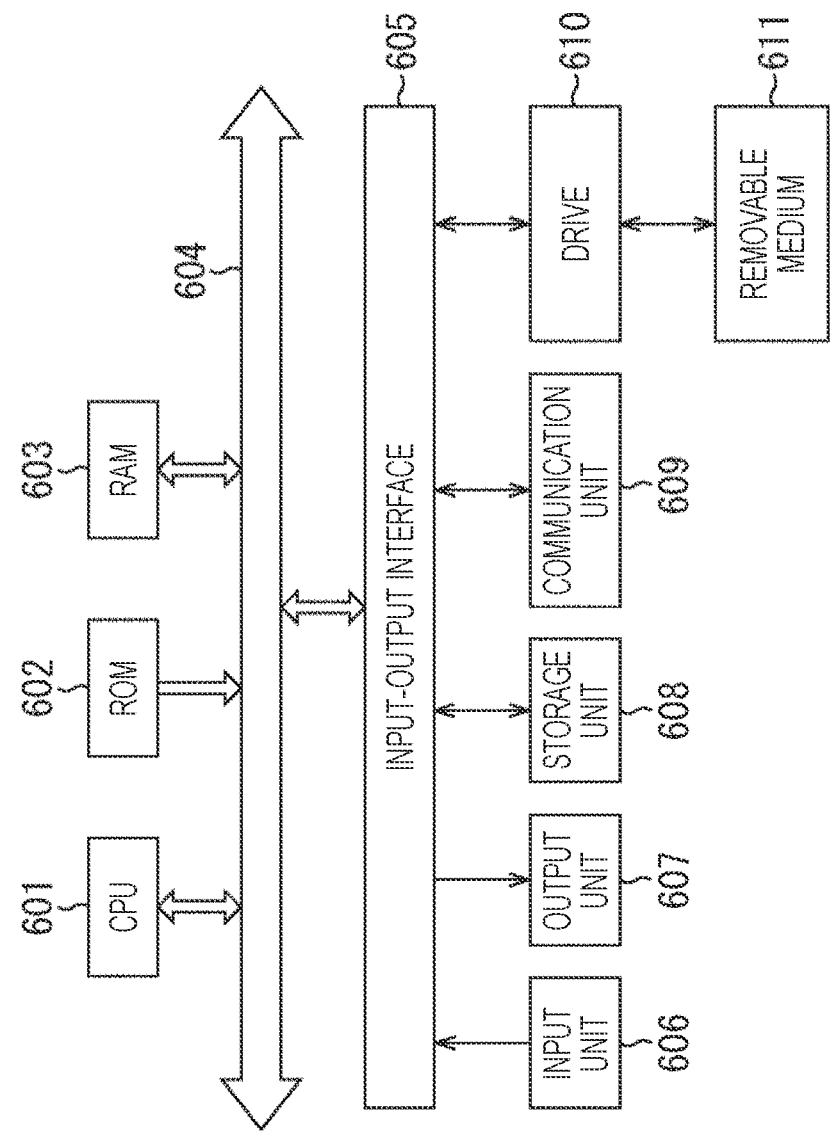
FIG. 17 is a block diagram illustrating a configuration example of a computer.

FIG. 17 is a block diagram illustrating a configuration example of hardware of a computer that executes the series of processing described above by a program.

In the computer, a CPU 601, a read only memory (ROM) 602, and a random access memory (RAM) 603 are mutually connected by a bus 604.

An input-output interface 605 is further connected to the bus 604. An input unit 606, an output unit 607, a storage unit 608, a communication unit 609, and a drive 610 are connected to the input-output interface 605.

The input unit 606 includes a keyboard, a mouse, a microphone, and the like. The output unit 607 includes a display, a speaker, and the like. The storage unit 608 includes a hard disk, a nonvolatile memory, and the like. The communication unit 609 includes a network interface and the like. The drive 610 drives a removable medium 611 such as a magnetic disk, an optical disk, a magneto-optical disk, or a semiconductor memory.

In the computer configured as described above, the CPU 601 loads a program, for example, stored in the storage unit 608 into the RAM 603 via the input-output interface 605 and the bus 604 and executes the program, whereby the above-described series of processing is performed.

The program executed by the computer (CPU 601) can be provided by being recorded in the removable medium 611 as a package medium or the like, for example. Furthermore, the program can be provided via a wired or wireless transmission medium such as a local area network, the Internet, or digital satellite broadcasting.

In the computer, the program can be installed in the storage unit 608 via the input-output interface 605 by mounting the removable medium 611 to the drive 610. Furthermore, the program can be received by the communication unit 609 via a wired or wireless transmission medium, and installed on the storage unit 608. Furthermore, the program can be installed in the ROM 602 or the storage unit 608 in advance.

Note that the program executed by the computer may be a program in which processing is performed in time series in the order described in the present specification, or may be a program in which processing is performed in parallel or at necessary timing such as when a call is made or the like.

Note that the embodiment of the present disclosure is not limited to the above-described embodiment, and various modifications can be made in a range without departing from the gist of the present disclosure.

The effects described in the present specification are merely examples and are not limited, and other effects may be provided.

Moreover, the present disclosure can also have the following configurations.

(1)

An information processing apparatus including:
a vibration detection unit configured to generate vibration information indicating a vibration state of a subject, on the basis of event data output from an event-based vision sensor (EVS), the event data including a pixel position, a time, and a polarity at which an event that is a luminance change for each pixel has occurred.

(2)

The information processing apparatus according to (1), in which the vibration detection unit has a frequency calculation unit configured to calculate a frequency of vibration of the subject as the vibration information on the basis of the event data.

(3)

The information processing apparatus according to (2), in which the frequency calculation unit generates frequency two-dimensional data having frequency information for the pixel position each, on the basis of the event data output during a predetermined period.

(4)

The information processing apparatus according to (3), in which the frequency calculation unit calculates the frequency information on the basis of an interval of the time at which the event with a same polarity has occurred at a same pixel position.

(5)

The information processing apparatus according to (4), in which the frequency calculation unit calculates the frequency information by setting, as a frequency calculation target event, the event that is a temporally leading among the events with the same polarity that are consecutive.

(6)

The information processing apparatus according to any of (3) to (5), further including:
a display control unit configured to control displaying of a display image having display information according to the frequency information for the pixel position each, on the basis of the frequency two-dimensional data.

(7)

The information processing apparatus according to (6), in which the display information is color information.

(8)

The information processing apparatus according to (6), in which the display information is luminance information.

(9)

The information processing apparatus according to any of (3) to (8), in which the vibration detection unit further has an amplitude calculation unit configured to calculate an amplitude of vibration of the subject as the vibration information on the basis of the frequency two-dimensional data.

(10)

The information processing apparatus according to (9), in which the amplitude calculation unit calculates an amplitude of vibration of the subject by setting, as one piece of the subject, a pixel region having the frequency information that is same, in the frequency two-dimensional data.

(11)

The information processing apparatus according to (10), in which the amplitude calculation unit calculates an amplitude of vibration of the subject on the basis of a pixel continuous length of the pixel region.

(12)

The information processing apparatus according to (11), in which the amplitude calculation unit calculates an amplitude of vibration of the subject in a real space, on the basis of a relationship between a vibration direction of the subject and an image-capturing direction of the EVS and a relationship between a distance to the subject and a lens focal length.

(13)

The information processing apparatus according to (3), in which the frequency calculation unit calculates the frequency information by performing frequency analysis by restoring a luminance change for the each pixel on the basis of a time series of the polarity included in the event data.

(14)

The information processing apparatus according to (13), in which in a case where the EVS is vibrating, the frequency calculation unit calculates the frequency information by removing a frequency component of vibration of the EVS from a result of the frequency analysis.

(15)

The information processing apparatus according to any of (1) to (14), in which the information processing apparatus is configured as computer.

(16)

The information processing apparatus according to any of (1) to (14), in which the information processing apparatus is configured as a companion chip electrically connected to the EVS.

(17)

An information processing method including,
by an information processing apparatus,
generating vibration information representing a vibration state of a subject, on the basis of event data output from an event-based vision sensor (EVS), the event data including a pixel position, a time, and a polarity at which an event that is a luminance change for each pixel has occurred.

(18)
A program for causing a computer to execute processing including:
generating vibration information representing a vibration state of a subject, on the basis of event data output from an event-based vision sensor (EVS), the event data including a pixel position, a time, and a polarity at which an event that is a luminance change for each pixel has occurred.

REFERENCE SIGNS LIST

10 EVS camera
11 EVS
20 Information processing apparatus
21 Input unit
22 Processing unit
23 Display unit
30 Vibration detection unit
31 Frequency calculation unit
32 Amplitude calculation unit
40 Display control unit
210 EVS camera
211 EVS
212 Processing unit
231 Companion chip

The invention claimed is:

1. An information processing apparatus comprising:
a memory storing a program, and
a processor configured to execute the program to perform operations comprising:
generating, for each of a plurality of pixels, vibration information indicating a vibration state of a subject, on a basis of event data output from an event-based vision sensor (EVS), the event data including a pixel position, a time, and a polarity at which an event that is a luminance change for each of the plurality of pixels has occurred;
calculating a frequency of vibration of the subject as the vibration information on a basis of the event data;
generating frequency two-dimensional data having frequency information for the pixel position for each of the plurality of pixels, on a basis of the event data output during a predetermined period; and
calculating an amplitude of vibration of the subject as the vibration information on a basis of the frequency two-dimensional data,
wherein calculating the amplitude of vibration of the subject includes setting the subject as a pixel region including at least two of the plurality of pixels that have a same frequency information in the frequency two-dimensional data.

2. The information processing apparatus according to claim 1, wherein the operations further comprise:
calculating the frequency information on a basis of an interval of the time at which the event with a same polarity has occurred at a same pixel position.

3. The information processing apparatus according to claim 2, wherein the operations further comprise:
calculating the frequency information by setting, as a frequency calculation target event, the event that is a temporally leading event among events with the same polarity that are consecutive.

4. The information processing apparatus according to claim 1, wherein the operations further comprise:
controlling displaying of a display image having display information according to the frequency information for each pixel position, on a basis of the frequency two-dimensional data.

5. The information processing apparatus according to claim 4, wherein the display information includes color information.

6. The information processing apparatus according to claim 4, wherein the display information includes luminance information.

7. The information processing apparatus according to claim 1, wherein the operations further comprise:
calculating an amplitude of vibration of the subject on a basis of a pixel continuous length of the pixel region.

8. The information processing apparatus according to claim 7, wherein the operations further comprise:
calculating an amplitude of vibration of the subject in a real space, on a basis of a relationship between a vibration direction of the subject and an image-capturing direction of the EVS and a relationship between a distance to the subject and a lens focal length.

9. The information processing apparatus according to claim 1, wherein the operations further comprise:
calculating the frequency information by performing frequency analysis by restoring a luminance change for each of the pixels on a basis of a time series of the polarity included in the event data.

10. The information processing apparatus according to claim 9, wherein in a case where the EVS is vibrating, calculating the frequency includes removing a frequency component of vibration of the EVS from a result of the frequency analysis.

11. The information processing apparatus according to claim 1, wherein the information processing apparatus is configured as computer.

12. The information processing apparatus according to claim 1, wherein the information processing apparatus is configured as a companion chip electrically connected to the EVS.

13. An information processing method for an information processing apparatus, the method comprising:
generating, for each of a plurality of pixels, vibration information indicating a vibration state of a subject, on a basis of event data output from an event-based vision sensor (EVS), the event data including a pixel position, a time, and a polarity at which an event that is a luminance change for each of the plurality of pixels has occurred;
calculating a frequency of vibration of the subject as the vibration information on a basis of the event data;
generating frequency two-dimensional data having frequency information for the pixel position for each of the plurality of pixels, on a basis of the event data output during a predetermined period; and
calculating an amplitude of vibration of the subject as the vibration information on a basis of the frequency two-dimensional data,
wherein calculating the amplitude of vibration of the subject includes setting the subject as a pixel region including at least two of the plurality of pixels that have a same frequency information in the frequency two-dimensional data.

14. A non-transitory computer readable medium storing a program, the program being executable by a processor to perform operations comprising:
generating, for each of a plurality of pixels, vibration information indicating a vibration state of a subject, on a basis of event data output from an event-based vision sensor (EVS), the event data including a pixel position, a time, and a polarity at which an event that is a luminance change for each of the plurality of pixels has occurred;
calculating a frequency of vibration of the subject as the vibration information on a basis of the event data;
generating frequency two-dimensional data having frequency information for the pixel position for each of the plurality of pixels, on a basis of the event data output during a predetermined period; and
calculating an amplitude of vibration of the subject as the vibration information on a basis of the frequency two-dimensional data,
wherein calculating the amplitude of vibration of the subject includes setting the subject as a pixel region including at least two of the plurality of pixels that have a same frequency information in the frequency two-dimensional data.

* * * * *